Aug. 25, 1970 JEAN-JACQUES R. P. DE BUCK ET AL 3,525,815

ANALOG NETWORK TELEPHONE SWITCHING SYSTEM

Filed Feb. 4, 1966

6 Sheets-Sheet 1

Aug. 25, 1970 JEAN-JACQUES R. P. DE BUCK ET AL 3,525,815

ANALOG NETWORK TELEPHONE SWITCHING SYSTEM

Filed Feb. 4, 1966 6 Sheets-Sheet 3

ANALOG NETWORK TELEPHONE SWITCHING SYSTEM

United States Patent Office 3,525,815
Patented Aug. 25, 1970

3,525,815

ANALOG NETWORK TELEPHONE SWITCHING SYSTEM

Jean-Jacques René Paul de Buck, Vence, and Jean-Michel Montcouquiol, Paris, France, assignors to International Standard Electric Corporation, New York, N.Y.

Filed Feb. 4, 1966, Ser. No. 525,258
Claims priority, application France, Feb. 5, 1965, 4,538
Int. Cl. H04q 3/00
U.S. Cl. 179—18 8 Claims

ABSTRACT OF THE DISCLOSURE

An electronic system is provided to control a telephone switching network which is formed of switching blocks each comprising two cross-connected half-stages (primary and secondary) of crossgrid switches (e.g., crossbar switches or crosspoint matrices, particularly, reed-relay crossgrids. By means of this system, a free path can be selected between marked stages through any number of switching stages.

This invention relates to telephone switching systems in which the switching network comprises switching grids or matrices of cross points, linked together by suitably crossed bunches of links. In the U.S. Pat. No. 3,319,009 a selection system was described which makes it possible to select an available connection path through such a network.

The selection system described in that patent makes use of an analogous display network consisting of "nodes" which correspond to the switching grids and which are linked together by wires that correspond to the links. The nodes are multipled both sides on their inlet and outlet wires. In this analogous display network, a high point and a low point are designated which correspond to the input and output points respectively, in the switching network, and between which it is desired to establish a connection path. Marking is applied to this high point, it is led forward through all the wires which correspond to available links, and one of the marking paths that reach the low point is selected. This marking path defines a connection path in the switching network. It will be noted that the "points" referred to designate wires in the display network. The said patent provides that marking path sections are successively selected from the low or output point upwards or backwards and from one node to a preceding node. A selection device is first connected to the node, one outlet of which carries the designated low or output point. This device scans the inlets of this node to know those which are reached by the marking, and selects one of them. The wire carried by this inlet defines the low or output point for the following selection; the selection device will be connected to the preceding node, one output of which carries this same wire, to select an input of that node, and so on, up to the node, one inlet of which carries the designated high or input point.

This system presumes that the selection device discriminates the node inlets which it explores. To this effect, the said patent provides a time-distribution system: each inlet allows marking to pass in a time slot which is allotted to it in a scanning cycle. The selection device thus receives an incomplete train of pulses where the time position of the pulses designates the inlets which are reached by the downward or forward marking.

Consideration is being given, in the abovementioned patent, then, to distinguish the shortest connection paths. In the analogous display network, these paths are represented by marking paths which pass through the least number of nodes. The said patent provides that the propagation of the marking will stop for a time at passage through each node, in such a manner that the shortest marking paths will be covered in the shortest time, which will comprise the least number of stops. In order that a marking which will pass through a larger number of nodes, will not appear at the inlets of a node which is being scanned, during the same scanning cycle, the stops or pauses in passing through each node must cover the period of a scanning cycle.

Since selection of a marking path should be a quick operation, the question arises of shortening the time which the marking will take to go forward from the input point to the scanned node. The said patent considers making the marking pass at once through all available inlets of the successive nodes until it reaches the scanned node, and to time-distribute it only at the inlets of this latter node, which must be discriminated by the selection device. However, this arrangement would no longer enable distinguishing of the shortest paths by means of the above mentioned stops or pauses.

This invention provides means which will enable shortening of the time in which the marking in the display network goes down from the analogous high points corresponding to input points in the switching network to the scanned nodes (i.e., low points corresponding to output points in the switching network) whilst distinguishing the shortest paths through the stops in the propagation of marking. These means apply, principally, to switching networks formed of switching groups separately spread into primary and secondary half stages linked together by groups of links of a uniform pattern. However, it will be easily understood that some of these means can be applied also to differently shaped networks.

In accordance with a feature of the invention, the branch device, which is provided in the nodes for the connection of the selection device, is connected to the inlet gates of the node ahead of the common point which is multipled on these inlets, by branch wires containing branch gates. Marking can pass at once through all the inlet gates, but its passage through the branch gates is controlled by a time distribution. In this manner, marking can go through all the nodes without delay, or else with any suitable delays or stops, until the scanned node is reached, where the branch gates are used in the connection with the selection device. In a modification, the selection device is provided with a group of parallel inlets which will be connected to the separate branches of the branch device in the node. In this modification, the node inlets will be identified by the corresponding inlets in the selection device, so that a time distribution system will be no longer necessary. It will be noted, on this matter, that the selection devices include, generally, somewhere in their circuits, parallel inlets. Also, a series-parallel convertor must be inserted before these inlets where the signal applied to the selection device is a series signal, such as the abovementioned train of pulses. In the said modification, where a parallel signal will be applied to a selection device, this convertor will be no longer necessary.

In certain switching networks, some switching stages comprise an overflow device, and others not. The latter cannot extend to additional path sections, which would be the case when a connection would be extended through an overflow outlet, which would lead back by one or two stages. Therefore, in order to distinguish the shortest paths, it is not necessary to count the stages which have no overflow outlets (this is the case of the primary half-stages in the above-mentioned switching groups). In accordance with a feature of the invention, which completes the foregoing feature, stops are only provided in the passage through such nodes which belong to stages with overflow outlets. In many cases, marking can thus reach the scanned node without any stops.

In accordance with another feature of the invention, the half-stages of the abovementioned switching groups are represented, in the analogous display network, by multiple nodes in which a branch is provided for each rank of inlets and is multiplied on the inlets of this rank in the groups of inlets which correspond to those of the switching grids that form the half stage. Time distribution is applied to branches each of which contains an inlet gate which is opened in a time slot allotted to the corresponding inlet rank. The group of inlets of a node which correspond to the grid, the inlets of which are being explored, allows the marking to pass at once. The other groups of inlets of the same node, which correspond to the other grids in the half-stage, are simply locked out. The above mentioned modification also applies to the following arrangement: the branches can be connected in parallel to a set of inlets of the selection device, without time distribution. A stop in the passage of the marking towards the node outlet can be provided or not, according to whether the node belongs to a stage (or half-stage), with or without overflow outlets.

In the circuits described in the abovementioned patent, the stops in the propagation of marking from a node to the next were obtained by allotting an additional time slot to this propagation. This slot was defined by a pulse inserted between two trains of inlet gate pulses. This invention offers a modification in accordance with which all these stops are obtained by allotting alternative trains of pulses to successive stages. This alternative can be defined by means of alternatively positive and negative train pulses accompanying the successive trains of pulses.

The invention, furthermore, concerns means adapted to apply a link-availability marking, to the inlet gates of the nodes in the analogous display network. This marking is taken from a service wire in the switching network. It is assumed that in this system, the switching grids are equipped either in a manner to release all crossing points when a call has terminated, or in a manner to release the crossing points along the two coordinates of a new connection, when a new call is established. In accordance with the invention, a locking potential is applied at a terminal point of this wire when a call is established from this point, and is cut off when the call has terminated. This service wire is switched in the grids and connected between the grids like the other junction wires. The availability inputs or the inlet gates in the analogous display network are connected separately to the corresponding links of the service wire. In this manner, the busy links, that is to say, those engaged for a current call, carry the locking potential and lock the corresponding gates in the picture network, whereas the free links do not carry this potential, even if the crossing points in the grids remain closed after a call, whilst awaiting a a new call to be established through the coordinates of these crossing points.

The service wire thus established and controlled forms a continuous metal connection in an established connection path. It can be used to supply a relay or any other holding device connected to the other terminal point, to check the continuity of a connection between the two terminal points, to identify a terminal point connected to the other, etc.

It may be uderstood that this availability marking device, which directly links the gates of the display network to the wires in the analogous switching network, eliminates any device for memorising or storing the state of availability of the links, and offers, therefore, a great simplicity and a great operational safety.

The invention also concerns means adapted to identify the foregoing node in the analogous display network from the inlet selected in a scanned node. This foregoing node can indeed be identified by means of a storage containing the information on the pattern of the switching network. This pattern is fixed in the switching groups mentioned hereabove, but it can vary through the use of cross-connection distributing frames between the stages outside such groups. Such variations should be recorded each time in the storage which would be employed to identify the foregoing nodes which carry the wires selected in the display network. In accordance with this invention, when an inlet in a scanned node has bee selected, the forward marking is removed, an identification marking is applied to this inlet (which marking is, preferably, of the same potential as the forward marking), by means of separate connections connected to the inlet gates in the node, and the possible preceding nodes are tested by means of branch wires connected to the outlets of these nodes. The preceding node which must be used in the connection, will be known because of the fact that the identification marking will be collected on a branch wire which comes from that particular node.

This method of identification can have various modifications adapted to identify, for example, a node corresponding to a switching grid, a node outlet corresponding to a grid outlet, a section in a multiple node which corresponds to a secondary grid in a uniform switching group, the switching group itself etc. . . . according to a technique which is well-konwn per se.

Other advantages and features of the invention will appear from the more detailed description which will be made with reference to examples of embodiments shown in the attached drawings, in which:

FIG. 1 represents, schematically, a switching grid or matrix of crossing points, forming a component in the switching network;

FIG. 2 shows a single node device forming a component in the analogous display network in accordance with the above mentioned U.S. Pat. No. 3,319,009;

Figure 15A:
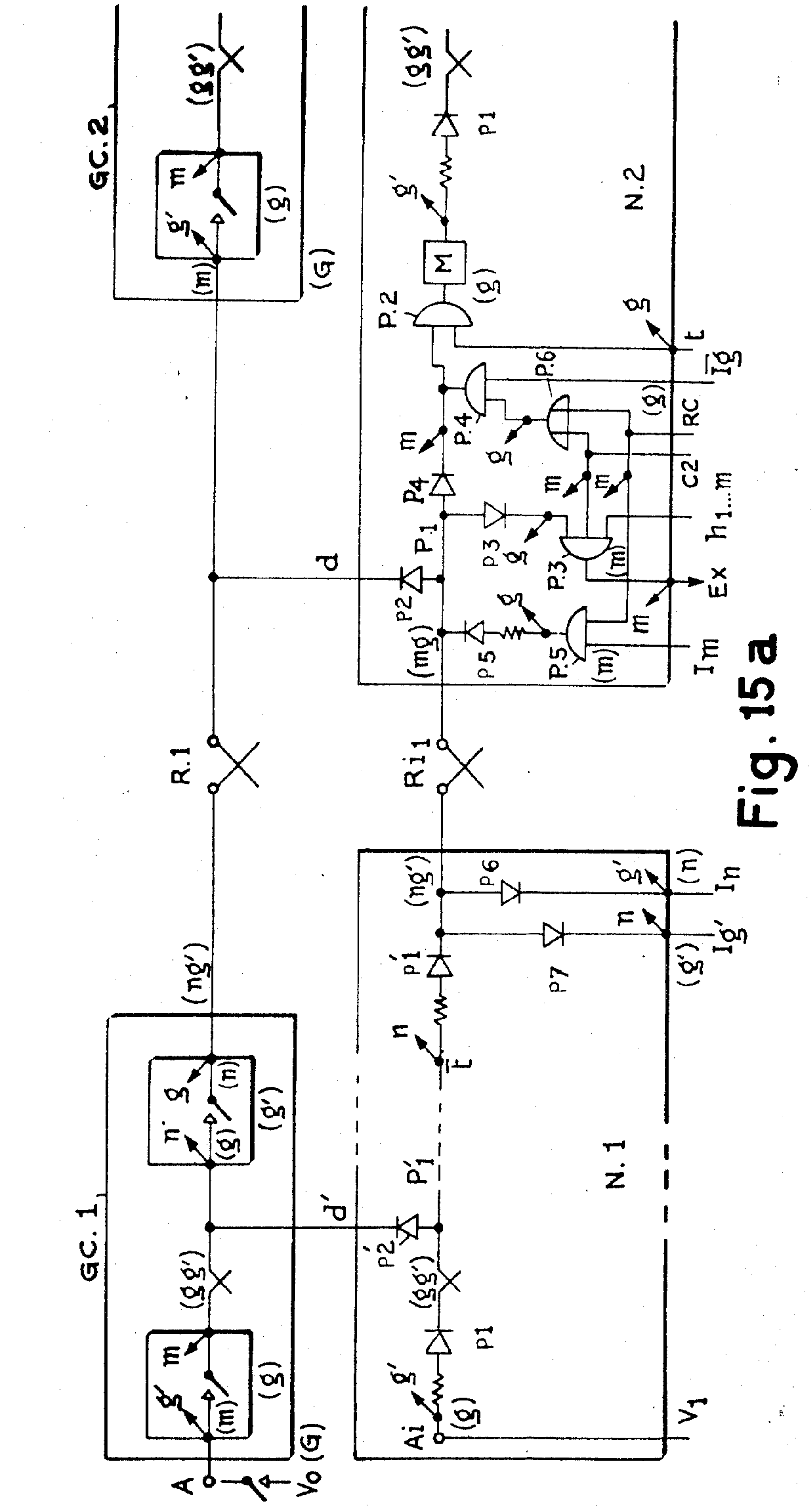
Figure 15B:
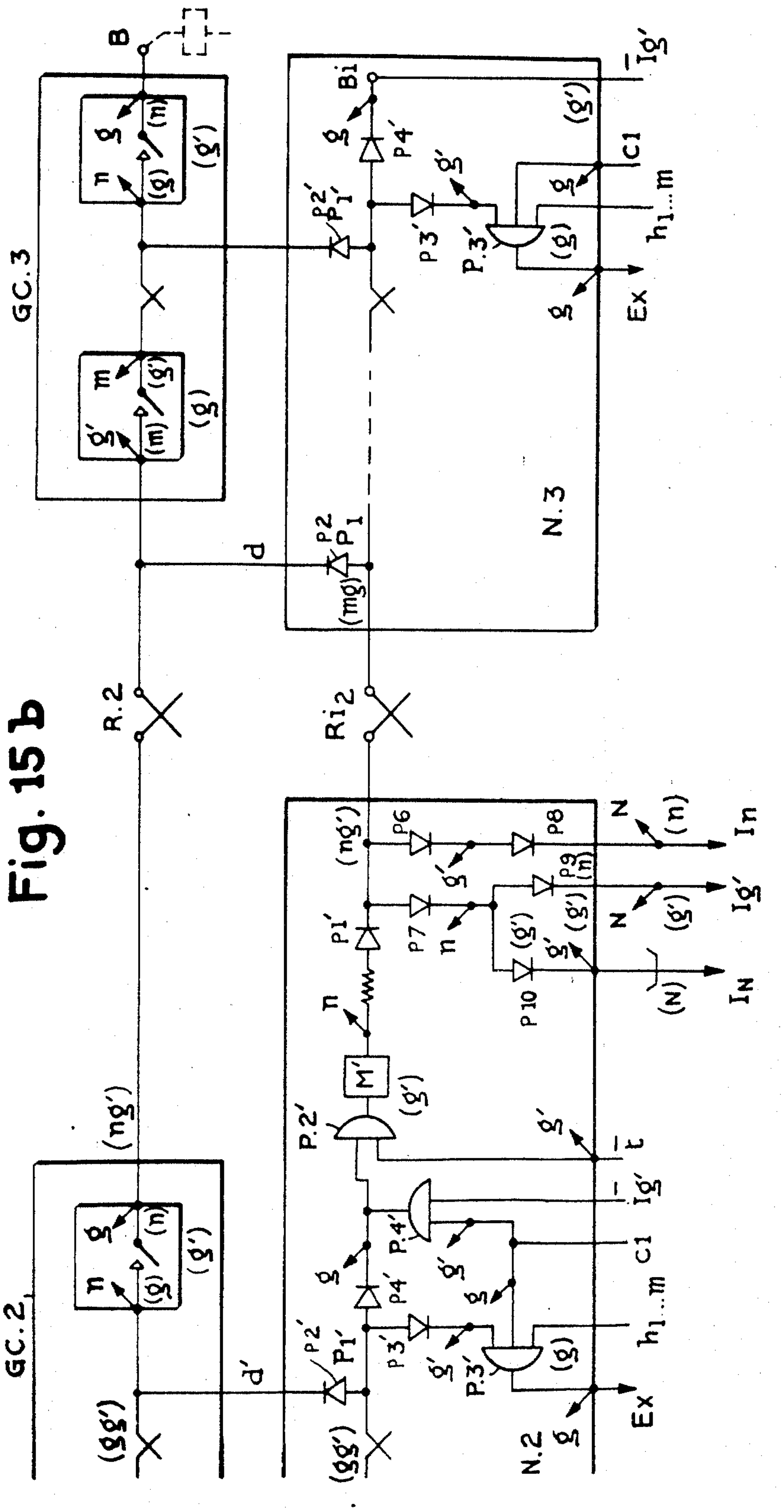
Figure 16:
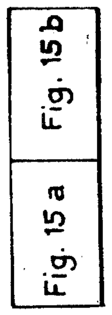
Figure 17:
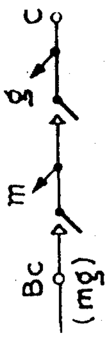
Figure 18:
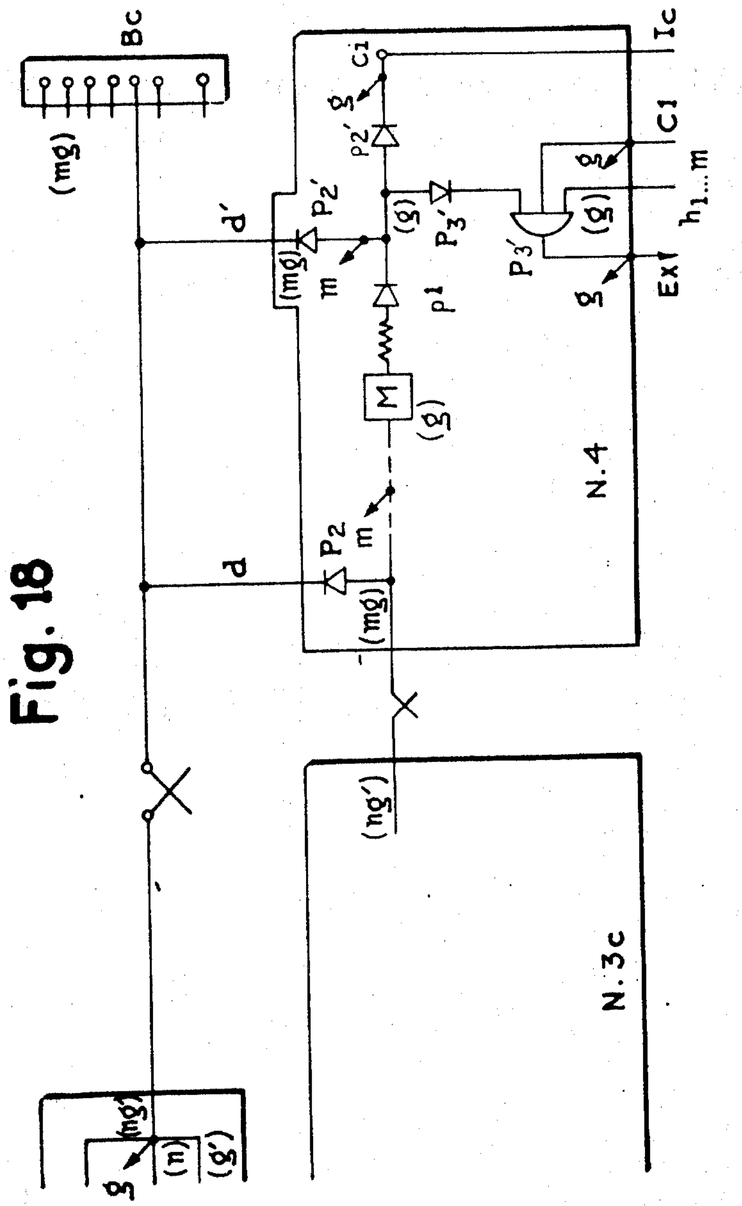

FIGS. 15*a* and 15*b*, together form a simplified diagram of a switching network and a detailed diagram of an analogous display network linked to this switching network, showing the availability marking and the identification marking, in accordance with the invention, in an example of embodiment where the switching network consists of uniform switching groups and the display network, of multiple node devices;

FIG. 16 shows the assembly of FIGS. 15*a* and 15*b*;

FIG. 17 is a simplified partial diagram, showing the equipment of a common point assumed to be linked to a group of output points of the same class in the switching network; and FIG. 18 shows an output point node used in the analogous display network in conjunction with a group of output points of one and the same class in the switching system, in the manner shown in FIGS. 15*a* and 15*b*.

Figures 1, 2, 3, 4, 5, 6:
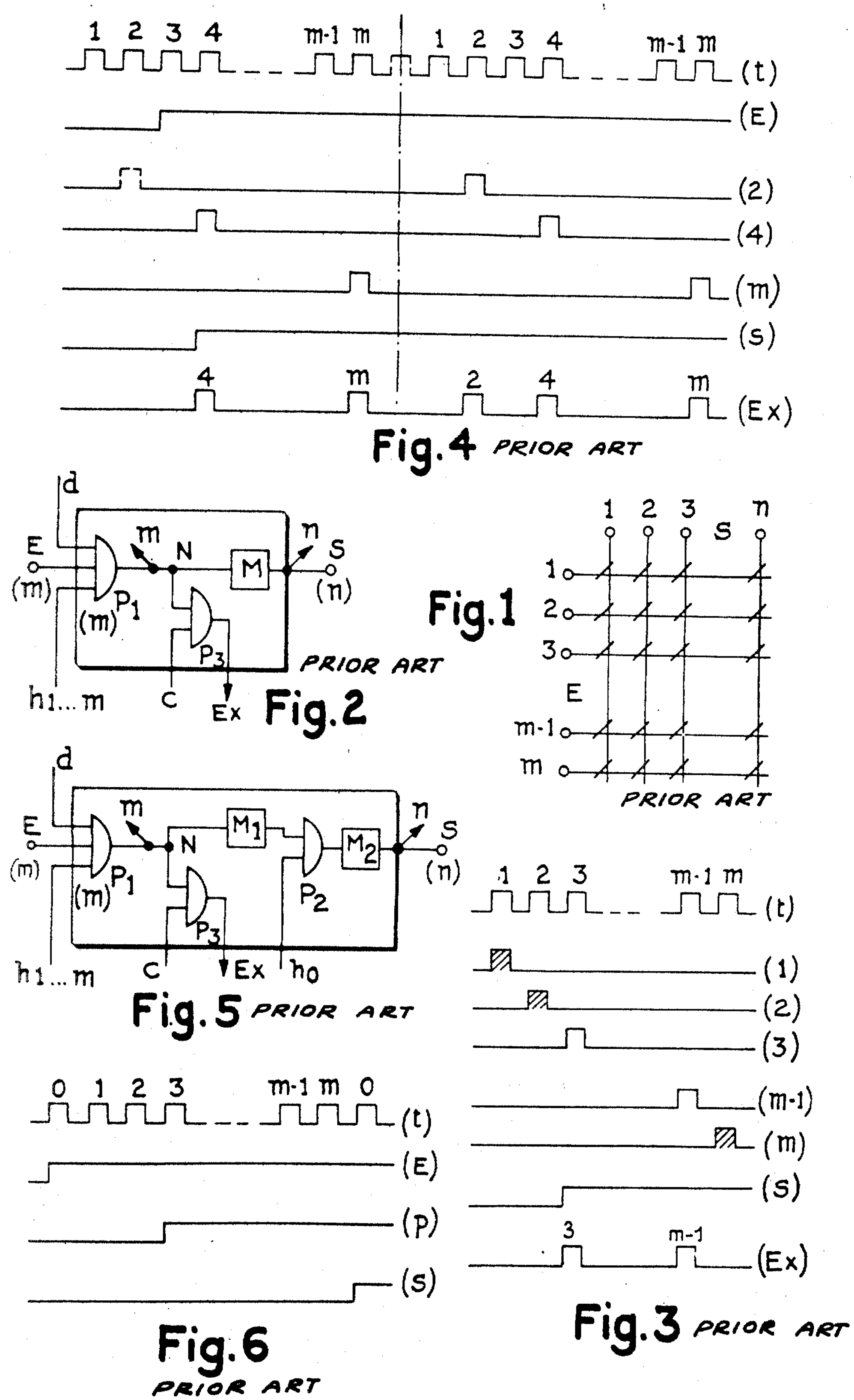
Fig.4 PRIOR ART, Fig.1 PRIOR ART, Fig.2 PRIOR ART, Fig.5 PRIOR ART, Fig.3 PRIOR ART, Fig.6 PRIOR ART
FIG. 3 is a diagram of the pulses used in the node of FIG. 2.
FIG. 4 is a diagram of the pulses which can take place in a network formed with the nodes of FIG. 2.
FIG. 5 shows a node device with delayed output, in accordance with the abovementioned patent.
FIG. 6 is a diagram of pulses used in the node of FIG. 5.

FIG. 1 shows the working diagram of a single switching grid, with *m* input multipilies E, *n* output multiples S and a matrix of crossing points (shown by oblique lines), between the two groups of multiples. In the abovementioned United States patent, a description has been made of an analogous display network consisting of node devices and adapted to search and select an available path through a switching network consisting of grids of this type. Also in this patent, a description was made of node devices adapted to figure more complicated switching grids. In the present description, it will be assumed that the switching grids are of the plain type shown in FIG. 1, but it must be understood that the characteristics of this invention also apply to other types of grids.

In the simple node shown in FIG. 2, inlets E are connected to separate inlet gates $P_1$. A time distribution system, momentarily opens these gates in time slots 1 to *m*, allotted to ranks 1 to *m* of inlets (pulses $h_1 \ldots m$). A wire *d* subordinates the opening of each gate to the availability of the corresponding link in the switching network. The outlets of these gates are joined at a common node point N. A memory device M is inserted between this point N and outlets S, on which it is simply multiplied. The search marking propagates, therefore, on all the outlets as soon as it reaches point N through the fisrt available gate, in order of ranks, that receives the marking at its inlet E. A common branch gate $P_3$ is connected to point N for connection of a selection device which is not shown on the drawing, in the search step where the node is the output point of the marking paths. This gate is then opened by an inlet wire *c*, and it delivers to the selection device, on its outlet wire E*x*, a train of pulses consisting of the pulses which pass through the inlet gates $P_1$. The selection device will know these gates from the time position of these pulses.

In FIG. 3, line (*t*) shows the clock-pulse signal, with its cycle of pulses 1 to *m*, Lines (1) to (*m*) show the single pulses which open gates $P_1$ of ranks 1 to *m*. It will be assumed that pulses 1, 2 and *m* will not pass since the links are occupied, or the corresponding wires in the analogous display network are not reached by the marking. These pulses are shaded on lines (1), (2) and (*m*). Pulse 3 is the first which will pass. Marking will appear, therefore, at the outlets of the node at time slot "3," as shown by lines (S). Line (E*x*) shows the pulses which would pass by the branch gate $P_3$ towards the selection device, if the node were the low point of the marking paths.

It will be obvious that the marking would propagate beyond the considered node starting from time position "3." It will now be examined, what can happen in the following node, which would receive this marking, for example, through gates "2" "4" and "*m*." This is shown in FIG. 4. Line (*t*) there, shows two successive cycles of the clock pulses. The first is that where pulses "3" and "*m*—1" have passed as stated with reference to FIG. 3. In FIG. 4, line (*e*) shows that the marking reaches the now considered gates in the first time slot "3." Line (2) shows that gate "2," which opens in time slot "2" (a pulse shown by a dotted line) will deliver no pulse, since the marking will only reach it in a later time slot. The lines (4) and (*m*) show that gates "4" and "*m*" will deliver their pulses, line (S) shows that marking will propagate further as from the time position "4." Line (E*x*) shows that the train of pulses branched towards the selection device will comprise pulses "4" and "*m*." Thus, the marking path passing through gate "2" will be rejected from the search if the scanning of the paths will be bound to that particular cycle. It will be understood that, from one node to the next, all the available paths could be rejected in this first scanning cycle. In the second cycle—if there is one—all the pulses will be present, as shown by lines (2) and (E*x*). These considerations show that scanning must be repeated until at least one pulse will be received. If it were stopped at that moment, the search would be limited to the marking paths the sections of which would have increasing ranks, which is not desirable. If this were to be extended to all paths, it would be necessary, on principle to let run as many cycles as there are nodes in a path, and to scan the last.

The abovementioned United States patent discloses a further arrangement, which makes it possible to achieve a more advantageous operation from certain points of view. This arrangement will withhold the marking in each node until the end of the cycle, as shown in FIG. 5. There are two series-connected memory devices $M_1$ and $M_2$, and connection between the two is controlled by a gate $P_2$ which will be opened in a time slot $h_0$, between the cycles $h_1 \ldots h_m$. Marking will thus propagate from one node to the other, cycle after cycle, and will comprise each time, all the paths independently of the rank of the inlet gates. FIG. 6 shows, on line (*t*), the clock pulses, which now include a pulse "0." In the time slot "0," the marking which comes from the preceding nodes will reach all the inlets of the considered node, as shown by line (E). Line (*p*) shows that the marking will reach gate $P_2$ in the time slot of the first pulse which will pass through an available gate, that is to say, in slot "3." Line (S) shows that the marking will appear at the outlets of the node in the slot "0" which will follow the cycle applied to the inlet gates of this node, whatever the slot, 1 to *m*, where a first pulse will pass.

This arrangement has another advantage: in the cycle where marking will finally reach the scanned node (the low point in the search), it will reach it only by the shortest paths, which are followed through the least number of node. It is possible, therefore, to limit the search to the shortest paths by limting the scanning to this first cycle. If all the shortest paths are busy, this cycle will give nothing, and the following cycle will bring the marking through the paths which have one more node, etc. In this manner, scanning will be effected on overflow or entr'aide paths if the normal paths are busy, whilst always limiting the scanning to the cycle which will be first to yield pulses towards the selection device.

Figures 7, 8, 9, 10, 11:
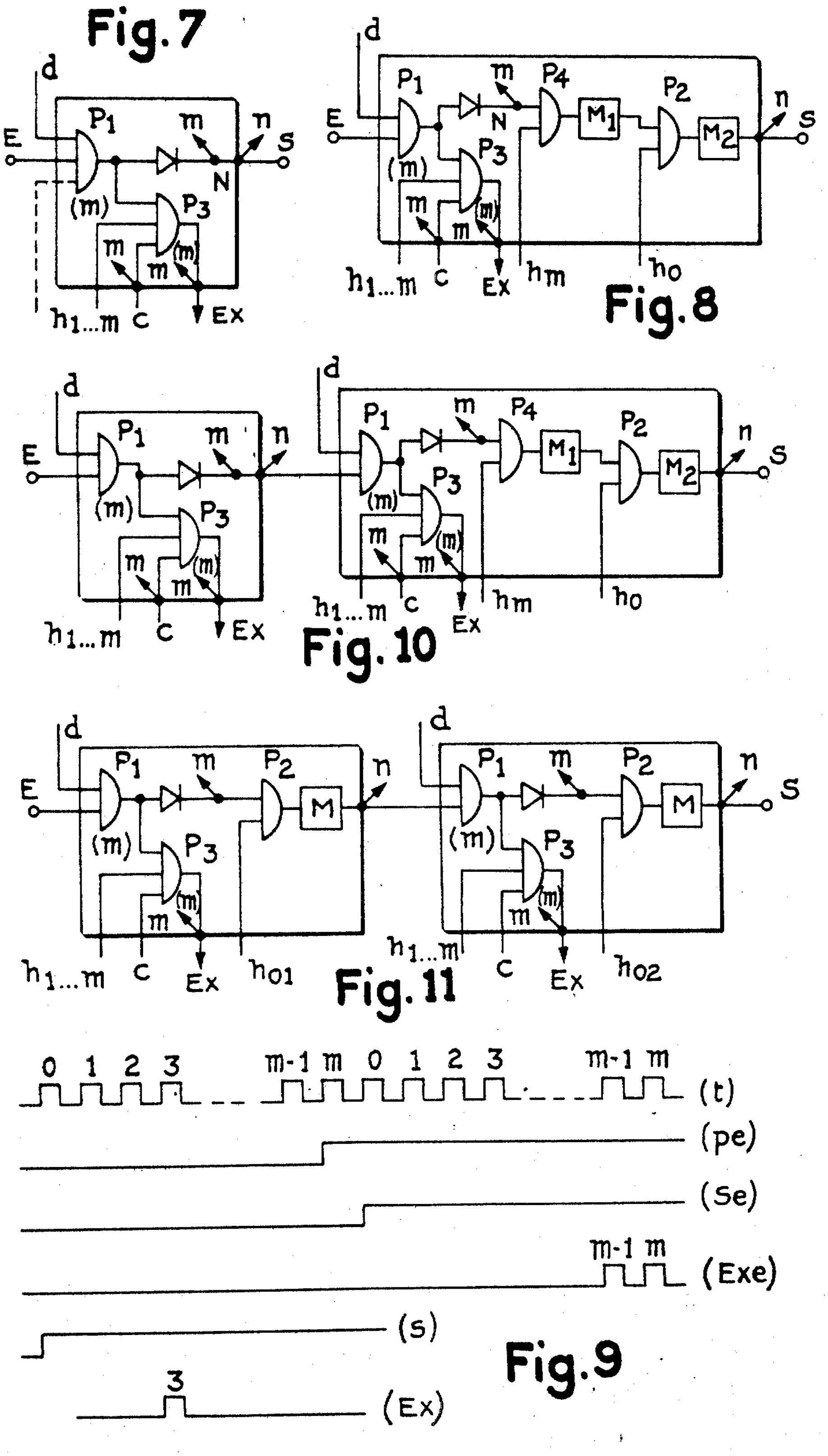
FIG. 7 shows a single node device, in which the time distribution is applied to a group of branch gates, in accordance with this invention.
FIG. 8 shows a node device with delayed output, with the same application of a time distribution.
FIG. 9 is a diagram of pulses used in the node of FIG. 8.
FIG. 10 shows a couple of node devices, in accordance with FIGS. 7 and 8, in analogous display network relative to a switching network consisting of two stages without overflow between the two.
FIG. 11 shows another couple of node devices, in which the two nodes are similar and in which each has a delay position at the output.

Propagation of marking, cycle after cycle, takes, however, a time which it is desirable to reduce. This invention offers an arrangement which is adapted to shorten the propagation of marking without coming back to the disadvantages mentioned hereabove with reference to the nodes in FIG. 2 and its diagram, FIG. 4. FIG. 7 shows the essential features of this arrangement in its application to the simple node in FIG. 2. The time distribution is no longer applied to inlet gates $P_1$, but to a group of branch gates $P_3$ which are connected separately to the inlet gates. These branch gates will only be used in the node which will be scanned at the output point of marking paths. In the nodes which are to be found in these paths, a standing marking applied to the inlets passes without hinderance through all the inlet gates (i.e. reaches the common point N and extends through it to the outlets S). In this arrangement, therefore, the marking applied to the input point of the marking paths will immediately reach the output point, without controlling the other nodes otherwise than the scanned one. However, the simple device in FIG. 7 has some disadvantages, like those of the device in FIG. 2, and just because of the fact it does not introduce any delay. It does not allow discriminating of the shortest paths after the propagation time of the marking.

FIG. 8 shows a device such as that in FIG. 7, but which introduces a one-cycle delay. To this effect, two memory devices, $M_1$ and $M_2$, are inserted between the common point N and outlets S, as in the device of FIG. 5. The memory device $M_2$ is again controlled by a gate $P_2$ which will be opened by a pulse $h_0$ after the distribution cycle. Another gate $P_4$ must be placed before the memory $M_1$, by reason of the fact that inlet gates $P_1$ are no longer controlled by the pulses. This gate $P_4$ can be controlled in any suitable manner to open between two pulses $h_0$: for example it can be opened by the last pulse $h_m$ of the distribution cycle.

The diagram on FIG. 9 assumes that the outlets $m-1$ and $m$ of the node on FIG. 8 are overflow outlets (this means to say: the outlets through which marking will reach inlet $m-1$ and $m$ in the scanned node through an overflow path). Line ($t$) shows the clock pulses, with pulse $h_0$ between the distribution cycles $h_1 \ldots h_m$. Marking is applied to the inlet gates $P_1$ and reaches common point N and gates $P_4$, at the very beginning of the cycle. The line ($pe$) shows that the marking will pass gate $P_4$ and reach gate $P_2$ at slot "$m$," which is the last slot of the distribution cycle. Line (S$e$) shows that marking will reach outlets S (which are overflow outlets), at slot "0." Line (Ex$e$) shows that the scanned node, which will then receive the marking through its inlets $m-1$ and $m$, will send it to the selection device through branch gates $P_3$, at slots "$m-1$" and "$m$" of the following cycle. Lines (S) and (E$x$) show that if the marking could have reached the scanned node by the shortest paths and, for example, through inlet "3" of this node, the selection device would have received a pulse in time slot "3" of the first distribution cycle.

Consideration is given, now, in the invention of the case of a switching network consisting of definite stages. Certain stages will have overflow outlets: in the analogous display network, the nodes of these stages must introduce a delay of one cycle (they will introduce it once in normal paths and twice in overflow paths). However, other stages will have no overflow outlet: those stages can let the marking pass without any delay. FIG. 10 shows a suitable arrangement of the analogous display picture network where nodes of the type on FIG. 7 are connected to nodes of the type on FIG. 8. Assuming that, in the switching network, there are three stages without overflow outlets, a fourth with such outlets, a fifth without overflow outlets, and a sixth with or without such outlets, the propagation of marking will only be delayed, in the analogous display network, by one cycle when the inlets of a node in the 6th or 5th stages will be scanned. The marking will reach, without any delay, the nodes in the four first stages—or the three that follow the first—if the first stage is figured by the high points in the system of the analogous display network. Thus, in the selection of a path, the total delay will be $1+1+0+0+0=2$ cycles, instead of $4+3+2+1+0=10$ cycles.

FIG. 11 shows an arrangement which is applied to switching systems consisting of paired stages where only the second of each pair has overflow outlets. This arrangement makes it possible to use similar node devices in all the stages with the same result as in the arrangement of FIG. 10. Instead of arranging the two delay devices (slot gate and memory device) in the second stage and none in the first, as in FIG. 10, there is one available in each stage. This introduces, however, a slight delay in the selection of a marking path since, when the inlets of the second node will be scanned, it will be necessary to wait for marking to have passed the delay device of the first. It is not wanted to make a difference between the inlet gates, according to their rank, it will be necessary for marking to pass the first node before the beginning of a scanning cycle. On the other hand, there will remain the condition that the marking pass through the first delay device before passing through the second. For example, instead of introducing a pulse $h_0$ between two cycles, it will be necessary to introduce two, a first $h_{01}$ to control gate $P_2$ of the first stage, and a second $h_{02}$ to control that of the second, as indicated in the drawing.

Figure 12:
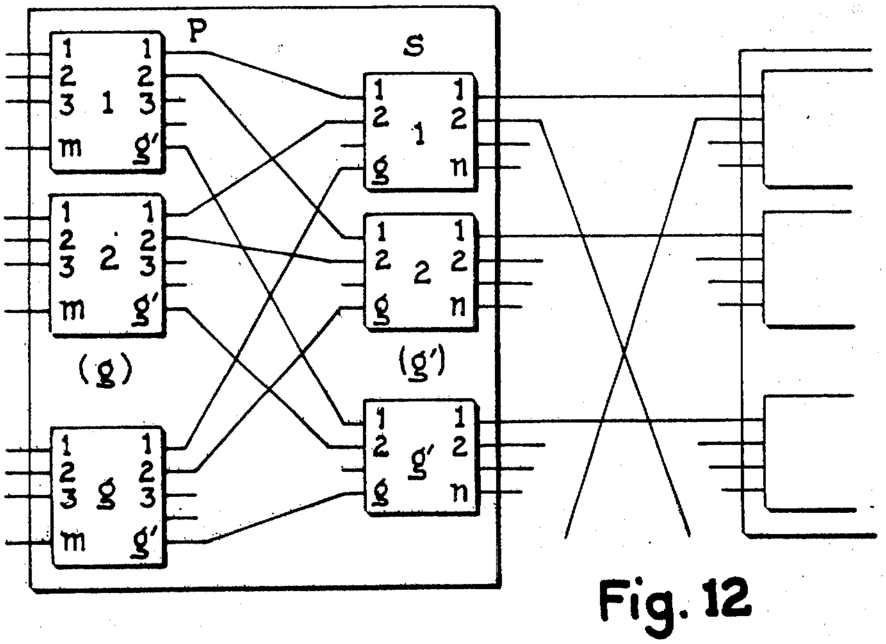
FIG. 12 shows a schematic diagram of a uniform switching group unit consisting of two half stages of switching grids.

Then, the invention considers the case of a switching network which comprises uniform switching groups. Such a switching group is shown in FIG. 12. It is spread into two twin stages, or half-stages, primary P and secondary S. In each half-stage, the switching grids are similar, these grids are cross-connected after the same crossing pattern. The primary half-stage includes $g$ grids with $m$ inlets each, and the secondary half-stage, $g'$ grids and $n$ outlets each. The primary grids have $g'$ outlets, each connected to a secondary grid. The secondary grids have $g$ inlets, each connected to a primary grid (of course, if the grids were cross-connected by pairs of links, etc., they would respectively have 2 $g'$ outlets, and 2 $g$ inlets, etc.). The invention offers a multiple node device to figure this uniform switching group more simply than by means of a node for each switching grid.

Figure 13:
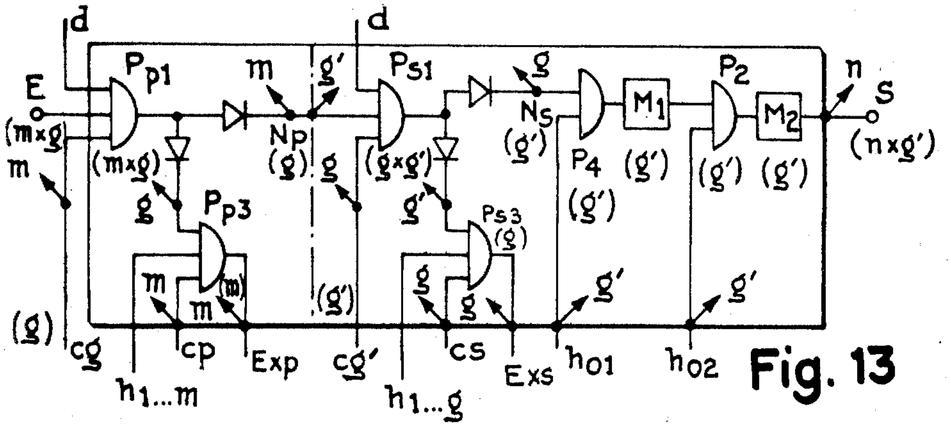
FIG. 13 shows a multiple node device, which figures the switching unit in FIG. 12 in accordance with this invention.

An example of a multiple node is shown on FIG. 13. In this example, it is assumed, furthermore, that the secondary switching grids have overflow outlets, whereas the primary grids do not have this, so that the multiple node shown is similar to the two nodes on FIG. 10. Inlets E of the multiple node are connected separately to $g$ groups of $m$ primary inlet gates $P_{p1}$. These gates have a third inlet which is adapted to open only the gates of a definite grid by means of $g$ wires $cg$ each multiplied on the $m$ gates of its group, when the inlets of a definite primary grid are explored (all the gates remaining open when the marking passes the primary half-node). There are $m$ branch gates $P_{p3}$, one for each inlet gate rank, each branch being multiplied on the gates of the same rank in the $g$ groups. The outlets of $m$ gates of each group meet, furthermore, at a common primary point $N_p$ in such a manner that there are $g$ points $N_p$, each multiplied on $m$ outlets of gates $P_{p1}$. The separation between the inlets of gates $P_{p3}$ and common points $N_p$ is secured by diodes inserted in the two multiple systems. Common points $N_p$ are multiplied, each on $g'$ gates of same rank, in the $g'$ groups of $g$ inlet gates $P_{s1}$ in the secondary part of the multiple node. These gates, like the first ones, have a third inlet, by which it is possible to open the gates of only one definite switching grid when the secondary node is scanned. These gates are controlled, to this end, by $g'$ wires $cg'$, each multiplied on the $g$ gates of its group. The arrangement is then similar to that of the primary part, numbers $g$ and $g'$ being substituted respectively for numbers $m$ and $g$ in the multiples. Two stages of delay devices, $P_4$–$M_1$ and $P_2$–$M_2$, are inserted between the secondary common points $N_s$ and the $g'$ groups of $n$ outlets S. Gates $P_2$ are controlled by pulses inserted between the distribution cycles, and gates $P_4$ can be controlled by any pulses which would come before, as in the device shown on FIG. 8 or 10. It will, however, be assumed, in view of an arrangement which will be described hereinafter, that these gates will be controlled by two inserted pulses $h_{01}$ and $h_{02}$, as shown in FIG. 11.

Figure 14:
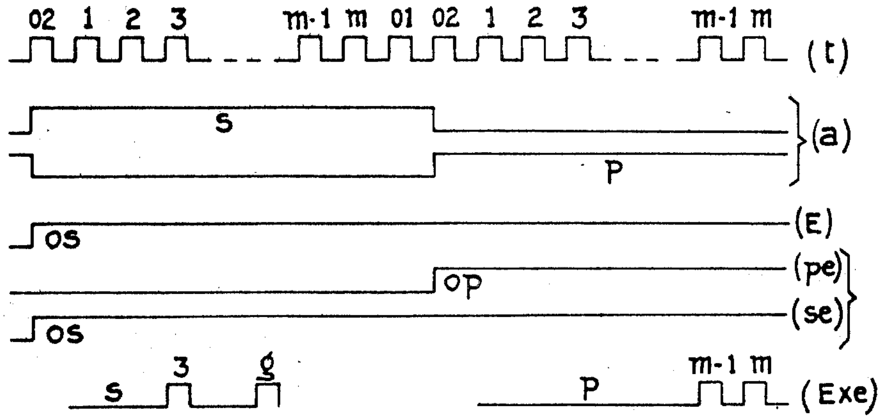
FIG. 14 is a diagram of the pulses used in the multiple node of FIG. 13.

The arrangement which has just been mentioned consists in allotting alternating scanning cycles to the primary and secondary half nodes of multiple nodes, as shown on the diagram of FIG. 14. This arrangement introduces a delay of two cycles in the propagation of marking through a multiple node, but it allows scanning of a primary half-node in the cycle which will follow the scanning cycle of its associated secondary half-node, without removing marking and applying it again between these two scannings, since the overflow paths will bring no marking before two cycles later. To leave the selection device which is connected to a secondary half-node, the time to select an inlet and to define a primary grid prior to scanning the primary half-node in the following cycle, it is best to insert more than one pulse between the two cycles, for example, the two pulses $h_{01}$ and $h_{02}$ mentioned hereabove, as shown by line ($t$) of FIG. 14. The double line ($a$) shows the two long pulses which alternately designate the odd cycles ($s$) for scanning the secondary half-nodes and the even cycles ($p$) for scanning the primary half-nodes. Line (E) shows the marking which is applied at slot "02" to the primary inlets of the multiple node by the shortest paths. This marking immediately reaches the inlets of the secondary half-node and makes it possible to scan them in the next starting cycle. After this cycle, pulse "*p*" of line (*a*) will control the selection device so as to cause it to scan the primary half-node in the following cycle. The lines (*pe*) and (*ps*) of FIG. 14 are relative to the following cycles, which will be used on the overflow paths if the normal paths have not marked the inlets of the scanned multiple node. The line (E*xe*) shows the pulses which will be sent in this case, to the selection device, by the two groups of branch gates: for example, pulses "3" and "*g*" for gates $P_{s1}$ and pulses "$m-1$" and "*m*" for gates $P_{p1}$ connected to overflow paths.

In these examples of embodiment of the multiple nodes, it has been assumed that the signals which pass in parallel through the branch gates are converted into series signals because of the fact that each gate is opened in a certain time slot and that the outlets of these gates join on a common wire E*s* which is connected to an inlet of the selection device. However, the selection devices include, in general, a group of parallel inlets on which it is necessary to distribute the series signals applied on the single inlet. The invention further provides that the branches can be connected separately to the said parallel inlets of the selection device, when the number of connection wires is not a decisive disadvantage. The distribution cycles could then be deleted, whilst, however, conserving suitable delays for the passage through the nodes, to distinguish the length of marking paths.

A description will now be given, with reference to FIGS. 15*a* and 15*b* (which assemble together in accordance with FIG. 16), of an example of embodiment in which the method of indicating the availability of links, and the method of identification of outlets in preceding nodes, in accordance with the present invention, will be applied. These are applied herein a display network which uses multiple nodes of the type shown on FIG. 13 and which figures a switching network consisting of uniform switching groups of the type shown on FIG. 12. It will, however, be understood that these methods can also be applied for indication and identification purposes in otherwise formed networks.

The switching network shown includes three stages of switching groups, such as GC.1, GC.2, GC.3. As on FIG. 12, each group contains *g* primary switching grids and *g'* secondary switching grids. Each primary grid has *m* inlets and *g'* outlets to the secondary grids. Each secondary grid has *g* inlets coming from the primary grids and *n* outlets. There are, therefore, *m.g'* crossing points in each primary grid, *g.g'* inner links between the primary outlets and secondary inlets, and *g.n* crossing points in each secondary grid. Of course, these numbers can be different in different switching groups, particularly from one stage to the next. From one stage to the next, the switching groups are linked by passing through crossing connection distributing frames R.1, R.2. On principle, the crossing in these distributing frames is such that each group in a stage has access to all the groups in the following stage. The overflow links are not shown. It will be recalled that it is assumed that there are no overflow links within the uniform switching groups, but only between outlets (secondaries) and inlets (primaries), of these groups. It is considered, in particular, that the overflow links will be provided between groups outlets, of groups such as GC.2 in a stage, and inlets of groups again such as GC.2, in the same stage.

The connection wire shown in the switching network is a service wire (such as the wire "C" in a connection path). Its circuit (which includes the links and the cross points) is, of course, the same as for communication wires ("A" and "B"). The terminal high point A of a connection path is carried by an inlet A of the switching group GC.1. A busying voltage V will be applied to this point of the service wire when the path will be busy with a call. This voltage will be cut off after the call, by means which are symbolized by a contact. However, the crossing points in the grids can remain closed in the switching group, in the system mentioned hereabove, for them only to open when the same multiples will be engaged in new connections. However, the links will not be reached by the busy voltage, unless they are engaged in a connection path during a call. In other words, an available link does not carry the busy voltage, even in a system where the crossing points will not immediately release after a call.

The corresponding analogous display network includes three stages of multiple nodes, such as N.1, N.2, N.3, each of which figures a uniform switching group. At the base, these nodes are of the type shown on FIG. 13. As on FIG. 13, the inlet gates $P_1$ $P_1'$ are formed in groups and each group of gates figures the group of inlets in a switching grid in the switching group. There are, therefore, *g* groups of primary gates $P_1$, each of *m* gates, and *g'* groups of secondary gates $P_1'$, each of *g* gates. The structure of these gates, which are shown symbolically in FIG. 13, is shown in detail on FIGS. 15*a* and 15*b*. The availability wires *d*, *d'* connect, separately, inlet points $P_1$ and $P_1'$ to the service wires in corresponding links. Through these connections, the busy voltage on the busy links will lock the corresponding gates in the analogous display network, whilst the gates corresponding to available links will allow the forward marking to go through.

Node N.2 of the mean stage is shown completely, its primary portion on FIG. 15*a* and its secondary portion on FIG. 15*b*. The forward marking is applied to primary inlets $P_1$, FIG. 15*a*, through resistances and diodes $p_1'$, which are placed in the outlets of the preceding nodes such as N.1 with regard to the identification device shown in this embodiment. Otherwise, these components would be placed at the inlets of node N.2. Diodes $p_2$ are inserted in an opposite direction in the availability wires *d* to suppress the forward marking voltage by the busying voltage $V_0$ on inlets $P_1$ which figure busy links. The inlet diode $p_5$ which is connected to inlet $P_1$ belongs to the identification device. The outlet diode $p_3$ leads to branch gate $P_3$. The outlet diode $p_4$ is inserted in the forward marking path in front of the delayed passage device consisting of gate $P_2$ and memory M. Gates $P_3$, *m* in number, are associated to the inlet ranks and are multiplied on the inlets of like ranks in all groups of gates. Gates $P_2$, *g* in numbering, are associated to the groups of inlets and are multiplied on all inlets in each group. The delayed passage device, that is to say, the outlets of memory M, is multiplied on the primary outlets. The resistances and diodes $p_1$ through which the forward marking is applied to the secondary inlets are inserted here in the outlets of memories M, but they could be placed just at the secondary inlets, that is to say, after crossing of connections between the primary outlets and the secondary inlets in the node. In the secondary portion of the node (FIG. 15*b*), all this arrangement will be found again, except the inlet identification diodes.

It is assumed that the nodes are explored in alternative distribution cycles, $0_1$ for the secondary inlets, then $0_2$ for the primary inlets, as explained hereabove. To let the forward marking pass, the primary outlet gates $P_2$ are opened at time slots *t*, each time before a cycle $0_1$, and the secondary outlet gates $P_2'$, at a slot *t*, each time before a cycle $0_2$. In order to scan the primary inlets $P_1$, branch gates $P_3$ are opened by marking $0_2$, and to scan the secondary inlets $P_1'$, branch gates $P_3'$ are opened by marking $c_1$. The same markings $c_1$ and $c_2$, open at the same time, gates of groups $P_4$ and $P_4'$. Gates $P_4$ and $P_4'$ are associated with inlet groups, in the same manner as $P_2$ and $P_2'$, and are also multiplied on all inlets $P_1$ and $P_1'$ in the same group. In the primary portion of the node, FIG. 15*a*, the marking of cycle $c_2$ is applied on gate $P_4$ through an "OR" gate $P_6$, provided for the identification device, whereas in the secondary portion, FIG. 15*b*, the marking of cycle $c_1$ is applied directly to gates $P_4'$. Each group gate, $P_4$ or $P_4'$, receives (from the selection device not shown) separate negative marking $I_g$ or $I_g'$, to lock all groups inlets $P_1$ or $P_1'$, except in the group which must be scanned. It will be understood that this locking is effected by suppression of the forward marking voltage, as by the busying voltage. It will be recalled that the selection of links is effected upwards or backwards in the display network from low points corresponding to output points in the switching network to high points corresponding to input points in the switching network so that a node is scanned before the node which precedes it in space, and that within a node, the secondary inlets are scanned before the primary inlets.

In the first node N.1 (FIG. 15*a*), the secondary portion, which is not shown, is like that in node N.A (FIG. 15*b*), but the primary portion is reduced to a group of high or input points A*i*, a point per primary switching grid, since it is known in advance, which inlet A, and on which primary grid, is calling in the switching network. The downward or forward marking voltage $V_1$, is applied to point A*i*, which figures the calling grid. Points A*i* are simply multiplied on the primary inlet wires by resistances and diodes $p_1$.

In the last node of the image system, N.3 (FIG. 15*b*) the primary portion, not shown, is like that in Node N.2 (FIG. 15*a*). The secondary portion is reduced to inlets $P_1'$ (with their diodes $p_2'$ and $p_3'$, $p_4'$ and the inlet diodes $P_1$, not shown, which are placed in the primary outlets), and to a group of low or output points B*i*, one per secondary switching grid. These points B*i* are used likewise the group gates $P_4$, in node N.2, to lock the secondary inlets, except in the group which must be scanned. This group is known in advance, since the secondary switching grid which carries the output point called B in the switching network is known in advance.

In the example shown, which is relative to uniform switching groups, these groups have a fixed primary-secondary crossing diagram. Therefore, when a secondary inlet has been selected, it is easy to identify the primary grid which is linked to this inlet according to the known crossing diagram, which has been suitably stored in an appropriate fixed memory. On the contrary, the secondary grid, in a preceding switching group, which is linked to a selected inlet in a node, depends on the crossing diagram between the stages, as carried out on the cross-connection distributing frames. This diagram is complicated and subject to modifications. It would, therefore, be still possible, but much less easy to identify a group of secondary outlets in a preceding node by referring to a device which would store such a crossing diagram. FIGS. 15*a* and 15*b* show an identification device according to the invention, which cooperates directly with the primary inlets of the nodes and the secondary outlets of the preceding nodes, without using a storage device for the crossing diagram.

This identification device includes an inlet device which marks a selected inlet in a node, and an outlet device, which will known the outlet of a preceding node, on which this marking will appear. This inlet device is shown at the inlet of node N.2 (FIG. 15*a*). It includes a group of *m* gates $P_5$, one gate for each inlet rank. Each gate $P_5$ is multiplied on the inlets of the same rank in *g* groups of gates $P_1$ which figure the inlet groups on the *g* primary switching grids. This multiplying is effected through the resistances and diodes $p_5$, already mentioned. The gates $P_5$ have two inlets. One inlet of the gate associated with a rank of inlets in the selected node receives the identification marking $I_m$. The other inlet receives a marking RC which controls the identification operation (it will be understood, that after scanning the primary inlets $P_1$ and selecting one of them, the downward marking is suppressed, and the identification is then operated). Marking is thus applied to the inlets of same rank in all the groups of gates $P_1$. Use is made of gates $P_4$, already mentioned, to suppress this marking in all the groups, except that which contains the selected inlet. There are *g* gates $P_4$, one per group of inlets (that is to say, one per primary switching grid in the switching network). These gates have two inlets. One inlet receives a negative marking $I_g$ in all gates $P_4$, except that which is associated with the selected group. The other inlet receives the marking RC which controls the identification, through the "OR" gate $P_6$ already mentioned. Thus, only the gate selected, defined by its rank and by the group which contains it, will carry the identification voltage. The voltage will be found at the other end of the connection wire, that is to say, on the corresponding outlet in a preceding node. Of course, the connection wires between the nodes, which figure the links of the switching network, pass through a crossing distributing frame $Ri_1$, similar to the distributing frame $R_1$ and which would receive the same modifications. The inlet device of the identification device is the same in the primary portion, not shown, of node N.3.

The outlet device, which answers the inlet device shown in node N.2, is shown in node N.1. Node N.1 belongs to the first stage, in which the calling switching group is known and, consequently, the node N.1 in the analogous display network is also known. It remains to identify an outlet of this node. The outlets are identified after their rank in the groups of outlets, which figure the groups of outlets in the secondary switching grids, and after the group to which they belong. Provision has, therefore, been made for *n* outlet wires, each multipled on the outlets of same rank in *g'* groups through diodes $p_6$, to identify the rank, and a group of *g'* outlet wires, each multipled on a group of *n* outlets through diodes $p_7$. The outlet which is reached by the identification marking applies this marking to one of the rank wires and to one of the group wires, whereby this outlet will be identified.

In case of identifying a node outlet in a node of a medium stage, such as N.2, from an inlet selected in node N.3, it is further necessary to identify the node, that is to say, the switching group in such stage. In the secondary portion of node N.2 (FIG. 15*b*), an outlet device is shown which is adapted to identify this node N.2, and in this node, the group of outlets and the rank of the outlet which is connected (through a crossing distributing frame $Ri_2$ similar to the distributing frame $R_2$ in the switching network) to the inlet which has been selected in node N.3. This device comprises two multipling stages with their decoupling diodes. The group of wires $I_n$ which identify the rank is multipled first on N bundles, one per switching group which can be linked to the group represented by node N.3. These bundles are decoupled by diodes $p_8$. Then, in each node, the bundle which is associated with it is multipled on the *g'* groups of outlets. A wire $I_n$ which is reached by the identification marking thus identifies the rank of the outlet in one of the groups, in one of the nodes such as N.2. The group of wires $I_{g'}$ which identify the group of outlets (that is to say, the secondary switching grid), is multipled, in a similar manner, first on N bundles, one per node (that is to say, one per possible switching group). These bundles are decoupled by diodes $p_9$. Then, in each node, the bundle which is associated with it is multipled on the *n* ranks of outlets. Wire $I_{g'}$ which is reached by identification marking thus identifies a group of outlets in one of the nodes such as N.2. Finally, a group of N wires $I_N$ will allow to identify the node. Each of these wires goes to a node, where it is multipled, first on *g'* diodes $p_{10}$, one per group of outlets. The inlet of each of these diodes joins the inlet of one of the *g'* diodes $p_9$, so that it is multipled with the latter on the *n* outlet ranks. Each wire $I_N$ is thus linked to all the outlets in a node. A wire $I_N$ which is reached by the identification marking will thus identify the node N.2 which is connected to the selected inlet in node N.3. The outlet of a node which is linked to the selected inlet in a node that follows it in space, will be thus completely identified. Of course, the group of wires $I_N$ could be combined with the bundles $I_n$ instead of the bundle $I_{g'}$. In the case where the mean stage would be crossed twice, by the use of an overflow path, the selection in the primary portion of node N.2 would designate an overflow inlet, and the identification operation would designate an overflow output of the same node N.2, or of another node such as N.2. After a further selection in the secondary portion of this node, the selection in its primary portion would designate a normal inlet, and the identification operation would designate a normal outlet of a node such as N.1.

FIGS. 17 and 18 show the case of a free group search in a group of low or output terminal points $B_c$ of a given class of service, as for example, a group of lines carrying the same subscriber number (PBX-group), or a group to town junctions or toll circuits serving the same direction. The arrangements which can be used in the case where the network will include several groups of similar points will be in the scope of the artsman's skill. It will be assumed that the group shown is more numerous than a group of inlets in a switching grid of the type used in the network. According to the main patent hereinbefore referred to, it will be assumed that the switching network will be extended as shown in FIG. 17. Points $B_c$, numbering *m.g,* would be connected to *m* inlets of *g* primary switching grids, reduced to a single outlet each. The *g* primary outlets would be connected to *g* inlets of a single secondary grid, reduced to a single outlet which would be connected to the common low or output point C. The analogous display network must figure this assumed extension of the switching network.

FIG. 18 shows the device used. The group of similar terminal points $B_c$ in the switching network, is connected to outlets from one or several secondary switching grids in one or several switching groups. In the analogous display network, the node N.4 figures the assumed extension shown on FIG. 17. The primary portion of this node is similar to nodes N.3 and N.2 on FIG. 15, except that the memories M only have one outlet with one resistance and one diode $P_1$, instead of being multipled each on *g'* outputs. The secondary portion is similar to that of node N.3, with the difference that each scanning gate $P_3'$ is connected to its associated gate $P_1'$, instead of being multipled on several groups of secondary inlets, and that there is only one low or output point *Ci.* Marking of the required class of service will be applied to this point by wire $I_c$. It will be understood that the preceding node N.3*c*, which figures the actual terminal switching group in the switching network, must have a full secondary portion, like node N.2 of FIG. 15, even if it is in the same stage as terminal nodes N.3 of FIG. 15.

It must be understood, furthermore, that the description with reference to some examples of embodiment must not limit the extent of the invention, which can extend to various other modifications.

What is claimed is:

1. An electronic system for selecting a connection path through a multistage switching network formed of linked switching grids, by selecting a marked path through an analogous display network formed of correspondingly linked node devices, defining a plurality of connection paths analogous to the corresponding path through the switching network; said system comprising means for supplying a forward marking through said node devices in said display network from input points corresponding to input points in said switching network to output points corresponding to output points in said switching network via the free links in said analogous display network, and means for selecting a marked path in said analogous display network; said selecting means comprising separate tapping branches in said node devices, each of said tapping branches including separate pulse-controlled gates for extending a marking through the node devices; means for supplying time-distributed control pulses to said tapping gates for identifying associated time slots, to enable each gate during a definite time slot; and a selection device for connecting itself to a selected node device responsive to said time-controlled pulses from free marked inlets of that node device, identifying these inlets responsive to the pulses identifying the associated time slots, selecting one of them, and selecting a next node device linked to that selected inlet.

2. A system according to claim 1, for selecting a direct connection path through a switching network where the switching grids in some of said stages have reversing links from overflow connection paths, and a corresponding linking in the analogous display network; said system further comprising delay means for delaying the extension of the marking through the display network by a time-distribution cycle in only the node devices of the stages that have reversing links; whereby the time-controlled pulses from all direct marked paths are collected by the selection device before any such pulses from overflow marked paths.

3. A system according to claim 2, for selecting a direct connection path through a switching network where a first switching stage having reversing links is connected to a second switching stage having no such reversing links, and a corresponding linking in the analogous display network; node devices in the analogous display network including delay means for delaying the extension of the marking through the two stages by a time-distribution cycle.

4. A system according to claim 2, for selecting a direct connection path through a switching network where any switching stages that have reversing links are of the same ranks in the network, and a corresponding linking in the analogous display network; said system comprising means for supplying the said time-distributed control pulses in alternating cycles to the said tapping gates in the node devices of alternating stages in the analogous display network; whereby the time-controlled pulses from any selected node device in a stage having reversing links are collected by the said selection device one time-distribution cycle before such pulses from a next selected node device.

5. A system according to claim 1, wherein each stage comprises two half-stages of uniformly linked switching grids, and a corresponding path through said analogous display network; and wherein said analogous display network is formed of multiple node devices corresponding to said switching grids in said switching network, each node device having several groups of inlets that correspond to groups of inlets of the several switching grids in a half-stage in said switching network; and having one group of tapping branches for all inlets of either half-stage, each tapping branch being multiplied onto the inlets of one definite rank in the several groups of inlets; and means for enabling a selected group of inlets, for collecting the said time-controlled pulses from the inlets of every rank in a group that figures a definite switching grid in a uniform group of said switching network.

6. A system according to claim 1, for selecting a connection path through a switching network comprising trunks controlled by linked switching grids, with the crosspoints operated in said switching grids for extending path, means for releasing crosspoints in only a part of said paths when extending another selected path by selecting a marked path through an analogous display network; said system comprising a service wire in the trunks of said switching network extended through the operated crosspoint in said switching grids; means for supplying a busying potential to such extended service wires in the connection paths only as long as these paths are busy in current communications; means responsive to applying said busying potential to inlet gates in said node devices in the analogous display network, for disabling said inlet gates; and separate busying leads from the service wire in the links of said switching network, to said corresponding inlet gates in the analogous display network; whereby said inlet gates in the analogous display network are disabled by said busying potential from the corresponding links in said switching network as long as these links are busy with a current communication in a connection path.

7. A system according to claim 1, and further comprising means in the said node devices and the said selection device for electrically identifying a node device linked to a selected inlet; said means comprising means for suppressing the marking extended through the analogous display network after an inlet has been selected by the selection device in said selected node device; means for supplying a marking to said selected inlet; identification tapping branches extending from all outlets of the node devices that may be linked to said selected inlet; and testing means in the selection device for identifying the node device actually linked to the said selected inlet after the tapping branch which brings the said marking from said selected inlet.

8. A system according to claim 7, wherein the inlets in the node devices in the analogous display network are provided with separate means for controlling the passage of the marking from the respective links in said network; said means including diodes in the links of the display network; said system comprising means for supplying an identification marking of the same polarity as the selection marking; said diodes being arranged in the said links at the respective outlets of the node devices, and the identification branches from the outlets of the node devices being tapped just below said diodes at said outlets.

References Cited

UNITED STATES PATENTS

| | | | |
|---|---|---|---|
| 3,051,793 | 8/1962 | Hiller | 179—18 |
| 3,148,247 | 9/1964 | Voegtlen | 179—18 |
| 3,226,486 | 12/1965 | Benmussa | 179—18 |
| 3,319,009 | 5/1967 | Regnier | 179—18 |
| 3,414,679 | 12/1968 | Regnier et al. | |

WILLIAM C. COOPER, Primary Examiner

W. A. HELVESTINE, Assistant Examiner